No. 717,446. Patented Dec. 30, 1902.
E. NIGGLI.
CHEESE CUTTER.
(Application filed Apr. 18, 1902.)

(No Model.) 2 Sheets—Sheet 1.

Witnesses
C. H. Walker
Geo. E. Tew

Inventor
Emil Niggli
By
Milo B. Stevens & Co
Attorneys

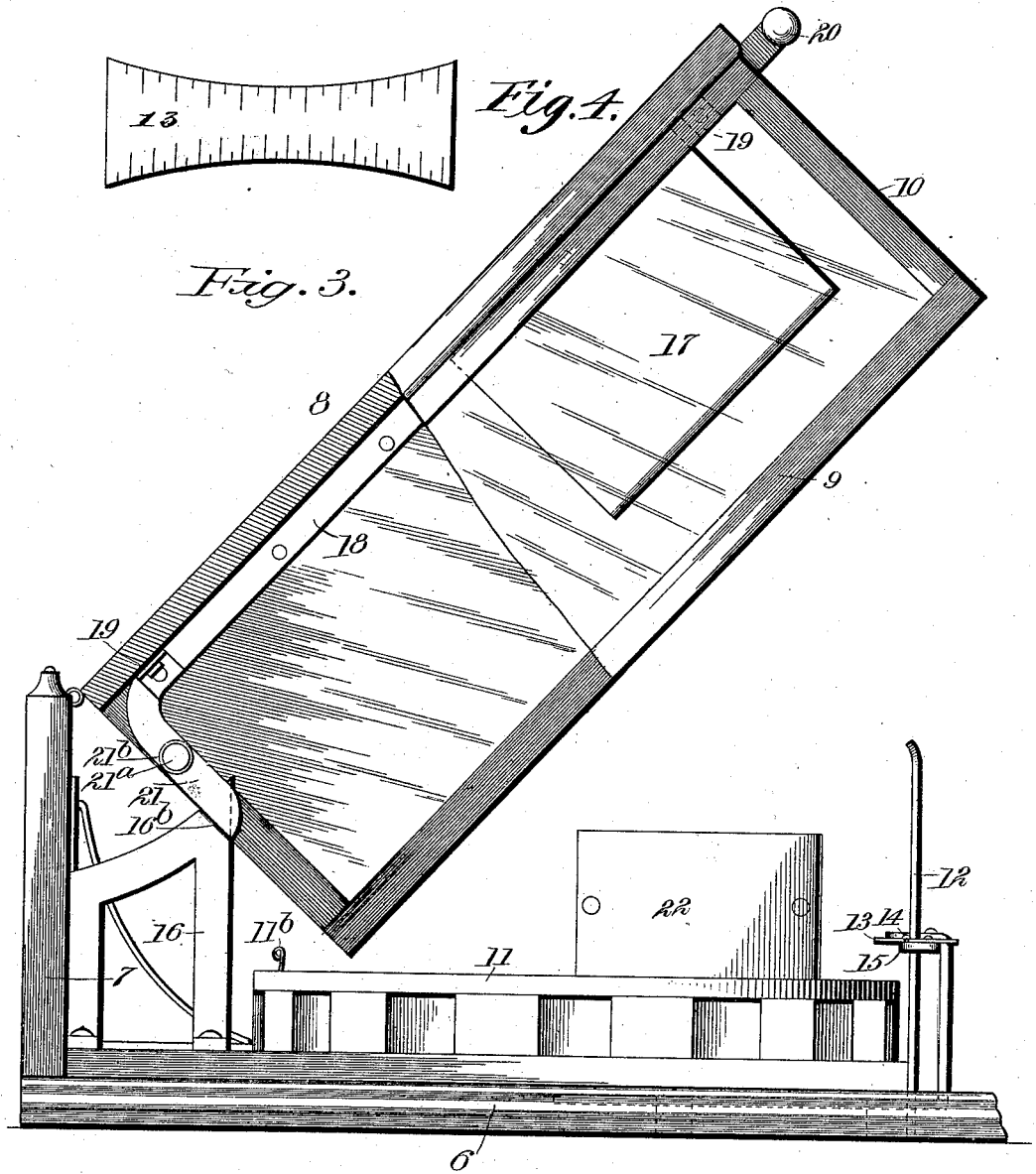

UNITED STATES PATENT OFFICE.

EMIL NIGGLI, OF SAN ANTONIO, TEXAS.

CHEESE-CUTTER.

SPECIFICATION forming part of Letters Patent No. 717,446, dated December 30, 1902.

Application filed April 18, 1902. Serial No. 103,474. (No model.)

*To all whom it may concern:*

Be it known that I, EMIL NIGGLI, a citizen of the United States, residing at San Antonio, in the county of Bexar and State of Texas, have invented certain new and useful Improvements in Cheese-Cutters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to cheese-cutters, and is particularly an improvement on the cheese-cutter described in my allowed application, Serial No. 74,770, filed December 9, 1901.

The novel features relate to the knife and its guides, the box and its cover to which the knife is attached, and to the means for holding the cheese in place on the rotatable platform.

Figure 1:
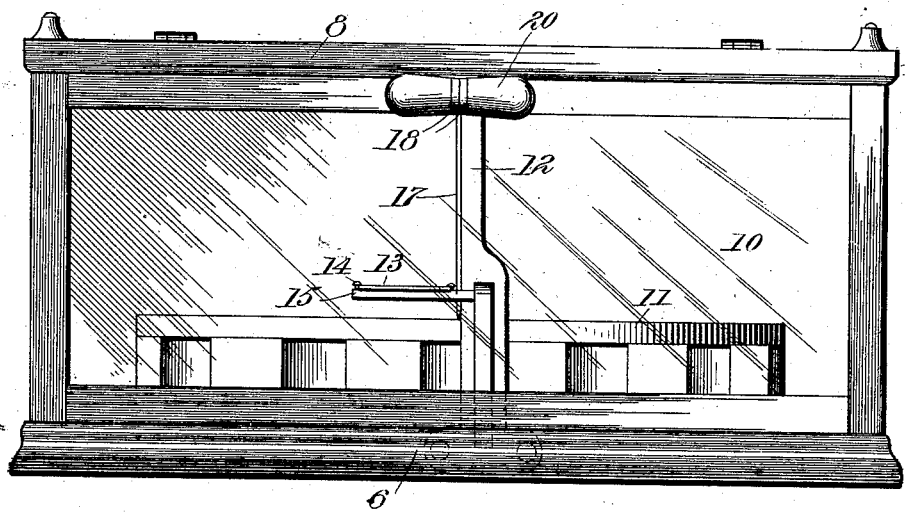
Figure 2:
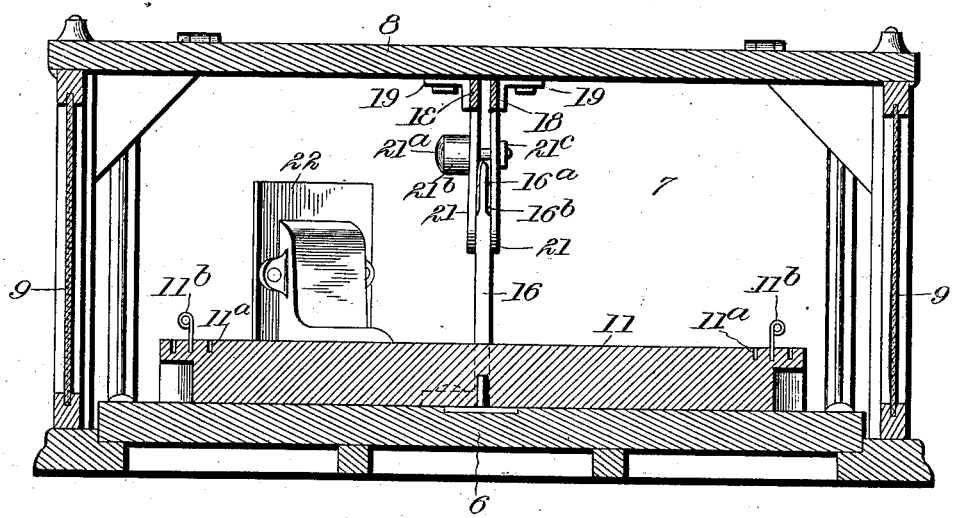

In the accompanying drawings, Figure 1 is a front elevation of the device with the cover closed and partly broken away. Fig. 2 is a cross-section. Fig. 3 is a side elevation, partly in section, with the cover and knife in raised position. Fig. 4 is a plan of one side of the scale-plate.

Referring specifically to the drawings, the cheese box or casing comprises a bottom 6, back 7, rigidly attached thereto, cover 8, hinged to the back, and sides 9 and front 10, joined to the cover. The sides and front are paneled with gauze or glass.

The circular platform 11, which carries the cheese, is rotatably mounted on the bottom of the box and has a series of holes $11^a$ to receive pins $11^b$, which bear against the sides of the cheese to hold the same in place. The holes are at different distances from the center to accommodate cheeses of different diameter.

A front knife-guide 12 projects vertically from the bottom of the box beside and in front of the platform. A scale-plate 13 is attached by binding-screws 14 to a bracket 15 and bears against the side of the cheese in the same manner as described in my former application, above referred to. The scale-plate has different scales on both edges of both sides, and it may be detached and reversed by loosening the binding-screws. The various scales are desirable for use with cheeses of different sizes.

A rear knife-guide 16, diametrically opposite the front knife-guide, is firmly bolted to the bottom of the casing and projects vertically beside the cheese-platform. The nose or point of the guide is reduced in thickness or beveled, as indicated at $16^a$, and a slight offset or shoulder $16^b$ is formed on each side thereof. These shoulders act as a stop or check to hold the knife and cover in raised position when desired, as hereinafter explained.

The back of the knife 17 is bolted between metal bars 18, which are firmly attached by brackets 19 and bolts to the cover of the box. The front ends of the bars extend outside the casing and are provided with a handle 20. The rear ends of the bars are bent downwardly or perpendicularly from the cover to form spring-arms 21, which are slightly spread apart to frictionally embrace between them the guide 16. In lowering the knife and cover the arms slide in contact with the guide one against each side thereof. The spread of the arms, and consequently the friction pressure thereof against the sides of the guide, is regulated by the adjusting-bolt $21^a$, which passes through a block of rubber $21^b$ under the head thereof and thence loosely through the arms. The rubber block yields to the spread of the arms as the guide enters between them, and the nut $21^c$ may be adjusted to regulate the pressure. A spiral spring may be substituted for the rubber block. The pressure or tension is so fixed that normally the friction contact of the ends of the arms against the shoulders $16^b$ will support the weight of the cover. This leaves the hands free to fix the cheese before making the cut desired. Downward pressure on the handle will then cause the arms to spread or spring over the shoulders and the knife to descend upon the cheese.

To cover and keep moist the exposed side of a cut in the cheese, I provide a weighted plate 22 to set on the platform against the side of the cut. The knife covers the other side. The weighted plate also assists in holding the cheese in the exact position in which it is placed on the platform.

Having thus described the invention, what I claim as new, and desire to obtain by Letters Patent, is—

1. A cheese-cutter, comprising a casing having a hinged cover, a rotatable platform in the casing, a knife carried by the cover, and guides for the knife beside the platform.

2. A cheese-cutter comprising a casing having a hinged cover, a knife fixed to and carried thereby, a cheese-platform within the casing, and guides for the knife.

3. A cheese-cutter comprising a casing having a hinged cover, knife-bars attached to the cover and a knife carried thereby, and a guide for the bars having a stop to normally hold the bars in raised position.

4. A cheese-cutter comprising a casing, a cheese-platform and knife-guides therein, knife-bars hinged to the casing and having a yielding friction contact with one of the guides normally sufficient to hold the bars in raised position.

In testimony whereof I affix my signature in presence of two witnesses.

EMIL NIGGLI.

Witnesses:
PETER KUPPERS,
LEO LANGWELL.